United States Patent
Mukoubara et al.

(10) Patent No.: US 8,069,906 B2
(45) Date of Patent: Dec. 6, 2011

(54) VEHICULAR EXHAUST HEAT RECOVERY APPARATUS WITH FROZEN WORKING FLUID MELTING

(75) Inventors: Yuuki Mukoubara, Kariya (JP); Seiji Inoue, Nukata-gun (JP); Kimio Kohara, Nagoya (JP); Kenshirou Muramatsu, Nishio (JP); Yasutoshi Yamanaka, Kariya (JP)

(73) Assignee: Denso Corporation, Kariya (JP)

( * ) Notice: Subject to any disclaimer, the term of this patent is extended or adjusted under 35 U.S.C. 154(b) by 798 days.

(21) Appl. No.: 12/221,056

(22) Filed: Jul. 29, 2008

(65) Prior Publication Data

US 2009/0032213 A1 Feb. 5, 2009

(30) Foreign Application Priority Data

Jul. 31, 2007 (JP) ................. 2007-199514

(51) Int. Cl.
*F02G 5/02* (2006.01)
*F28D 15/02* (2006.01)

(52) U.S. Cl. .. 165/41; 165/51; 165/104.21; 165/104.24; 165/134.1; 165/274; 237/2 A; 237/12.3 A; 237/12.3 B

(58) Field of Classification Search ............... 165/41, 165/51, 104.21, 104.24, 134.1, 274; 237/12.3 A, 237/12.3 B, 2 A
See application file for complete search history.

(56) References Cited

U.S. PATENT DOCUMENTS

| | | | | |
|---|---|---|---|---|
| 1,928,127 A | * | 9/1933 | Fritz et al. | 237/12.3 B |
| 2,040,159 A | * | 5/1936 | Vernet | 237/12.3 B |
| 2,076,287 A | * | 4/1937 | Arnold | 237/12.3 B |
| 2,131,635 A | * | 9/1938 | Mullen | 165/104.21 |
| 2,153,108 A | * | 4/1939 | Underwood | 237/12.3 B |
| 2,195,970 A | * | 4/1940 | Monson | 237/12.3 B |
| 4,667,876 A | * | 5/1987 | Negishi | 237/12.3 A |
| 4,982,895 A | * | 1/1991 | Shimizu et al. | 237/2 A |
| 5,195,577 A | | 3/1993 | Kameda et al. | |

FOREIGN PATENT DOCUMENTS

JP 59-035207 3/1984
JP 60-165210 11/1985

(Continued)

OTHER PUBLICATIONS

Office action dated Aug. 18, 2009 in corresponding Japanese Application No. 2007-199514.

(Continued)

*Primary Examiner* — John Ford
(74) *Attorney, Agent, or Firm* — Harness, Dickey & Pierce, PLC

(57) ABSTRACT

An exhaust heat recovery apparatus includes an evaporation unit, a condensation unit, an evaporation-side communication part and a condensation-side communication part. The evaporation unit is disposed in a duct member through which an exhaust gas generated from an engine flows, and evaporates an operation fluid by heat of the exhaust gas. The condensation unit is disposed in a coolant passage through which a coolant flows, and condenses the operation fluid by radiating the heat to the coolant. The evaporation-side communication part connects the evaporation unit and the condensation unit for introducing evaporated operation fluid to the condensation unit. The condensation-side communication part connects the condensation unit and the evaporation unit for introducing condensed operation fluid to the evaporation unit. The condensation-side communication part is in contact with an outer surface of the duct member at least at a part.

10 Claims, 12 Drawing Sheets

FOREIGN PATENT DOCUMENTS

| | | |
|---|---|---|
| JP | 62-268722 | 11/1987 |
| JP | 01-296090 | 11/1989 |
| JP | 02124313 A * | 5/1990 |
| JP | 03135819 A * | 6/1991 |
| JP | 04-028983 | 1/1992 |
| JP | 04-045393 | 2/1992 |
| JP | 06-117785 | 4/1994 |
| JP | 10-274487 | 10/1998 |
| JP | 2006-275302 | 10/2006 |

OTHER PUBLICATIONS

Office action dated Mar. 2, 2010 in corresponding Chinese Application No. 2008 10144892.7.

* cited by examiner

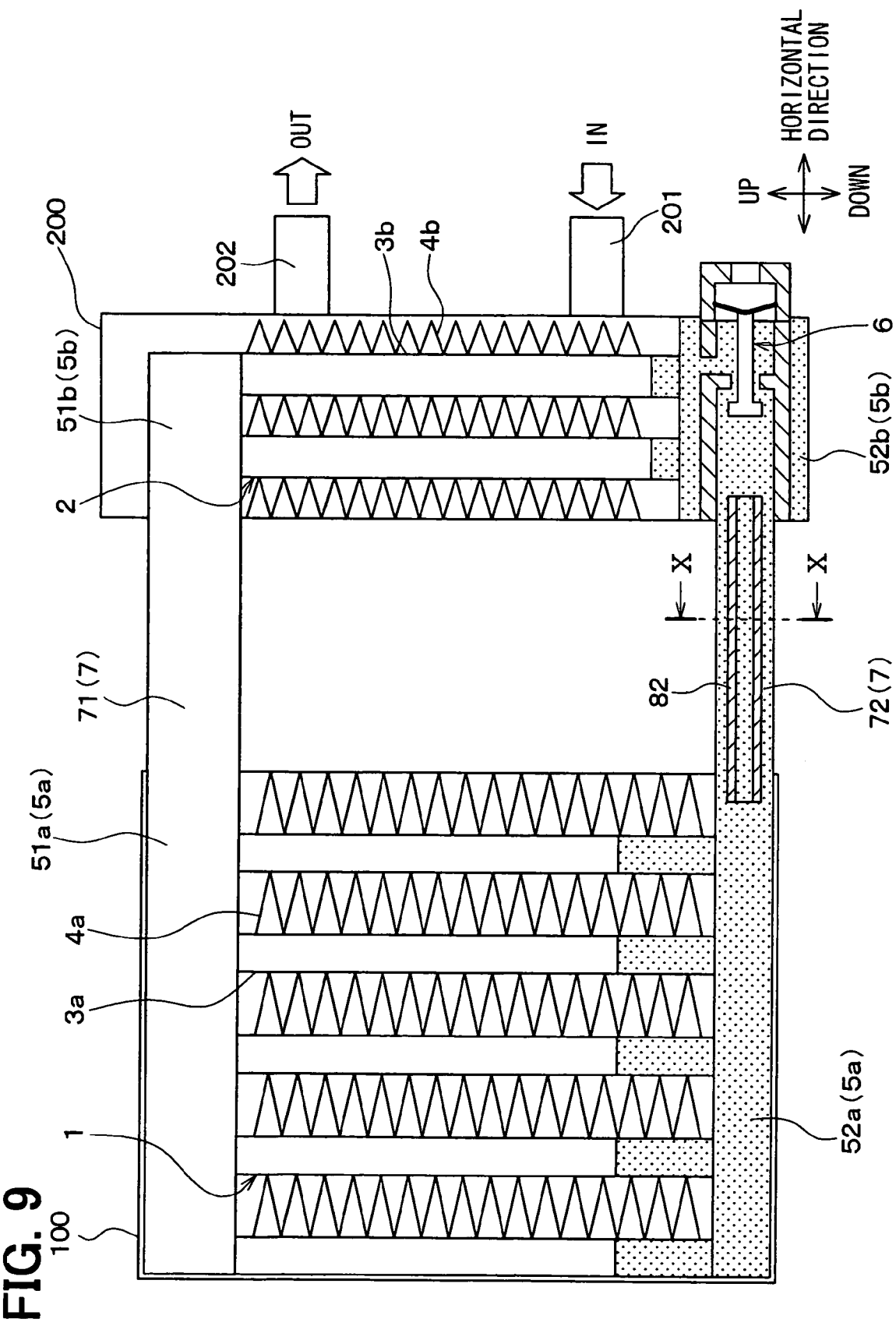

VEHICULAR EXHAUST HEAT RECOVERY APPARATUS WITH FROZEN WORKING FLUID MELTING

CROSS REFERENCE TO RELATED APPLICATION

This application is based on Japanese Patent Application No. 2007-199514 filed on Jul. 31, 2007, the disclosure of which is incorporated herein by reference.

FIELD OF THE INVENTION

The present invention relates to an exhaust heat recovery apparatus, which is used for a vehicle such as an automobile.

BACKGROUND OF THE INVENTION

It is known to recovery heat of exhaust gas from an exhaust system of a vehicular engine using the principle of heat pipe and to use the recovered heat for other purposes such as for warming the engine. For example, Japanese Unexamined Patent Application Publication No. 62-268722 describes an exhaust heat recovery apparatus for heating an engine coolant using heat of an exhaust gas generated from an engine. Specifically, an evaporation unit that forms a heat pipe is disposed in an engine exhaust pipe through which the exhaust gas flows and a condensation unit that forms the heat pipe is disposed in an engine coolant circuit through which the engine coolant flows.

As another example, Japanese Unexamined Patent Application Publication No. 4-45393 describes a looped heat pipe heat exchanger. The disclosed heat exchanger includes a looped closed circulation passage filled with an internal heat-transfer fluid, an evaporation unit disposed on the circulation passage for evaporating the internal heat-transfer fluid therein by receiving external heat, and a condensation unit disposed on the circulation passage at a position higher than the evaporation unit for performing heat exchange between the evaporated internal heat-transfer fluid and an external heat-transfer fluid.

In such a heat recovery apparatus, water is suitably used as an operation fluid. In a case where the water is used as the operation fluid, a passage of the operation fluid is blocked due to freezing under a low temperature condition, such as below freezing. In such a case, an operation of the exhaust heat recovery apparatus will be stopped.

To address the above issue, Japanese Unexamined Patent Application Publication No. 6-117785 describes a method of melting the frozen operation fluid. Specifically, the temperature of a heat pipe is detected at multiple positions. When it is determined that the operation fluid is frozen, the heat pipe is heated by a heater, thereby melting the operation fluid.

Further, Japanese Unexamined Patent Application Publication No. 10-274487 describes another method of addressing the freezing of the operation fluid. Specifically, the amount of the operation fluid of a part of heat pipes is reduced smaller than that of the other heat pipes. When the operation fluid is frozen, the operation of the part of the heat pipes having smaller heat capacity is melted first in a shot time. Then, the operation fluid of the other heat pipes having larger heat capacity is gradually melted by the heat of the part of the heat pipes, which is heated first.

In an exhaust heat recovery apparatus for a vehicle, for example, it is proposed to integrate an evaporation unit with a condensation unit so as to be simple and compact, which is effective for being mounted on the vehicle. FIG. 13 shows an example of a heat recovery apparatus in which an evaporation unit J1 having heat pipes J3 and a condensation unit J2 are arranged adjacent to each other with respect to a horizontal direction. An operation fluid, which has been evaporated in the evaporation unit J1, is introduced to the condensation unit J2 through an evaporation-side communication part J71. The operation fluid, which has been condensed in the condensation unit J2, is introduced to the evaporation unit J1 through a condensation-side communication part J72.

In the heat recovery apparatus shown in FIG. 13, when the water is used as the operation fluid, the operation fluid remaining in the condensation-side communication part J72 is frozen under the low temperature condition. Thus, the condensation-side communication part J72 is blocked. If an operation of an engine is started in the condition where the condensation-side communication part J72 is blocked by the frozen operation fluid, the operation fluid is not circulated until the frozen operation fluid is melted. That is, an exhaust heat recovery is not started until the frozen operation fluid is melted. As a result, a warming up operation is likely to be retarded.

To address this issue, the method as described in the publication No. 6-117785 may be employed. However, the number of parts increases due to the heater, and further manufacturing costs increase. Moreover, a size of the heat recovery apparatus may increase. Also, it is necessary to supply the heater with electric power from a battery of the vehicle.

In a case where the amount of the operation fluid of some of heat pipes is reduced, as described in the publication No. 10-274487, the heat capacity is reduced, resulting in a decrease in heat exchange efficiency.

SUMMARY OF THE INVENTION

The present invention is made in view of the foregoing matter, and it is an object of the present invention to provide an exhaust heat recovery apparatus, which is capable of shortening a time required to melt frozen operation fluid at a starting of an engine with a simple structure while maintaining heat exchange efficiency.

According to an aspect of the present invention, an exhaust heat recovery apparatus includes an evaporation unit, a condensation unit, an evaporation-side communication part, a condensation-side communication part. The evaporation unit is disposed in a duct member through which an exhaust gas generated from an engine flows, and performs heat exchange between the exhaust gas and an operation fluid flowing inside of the evaporation unit, thereby evaporating the operation fluid. The condensation unit is to be disposed in a coolant passage through which a coolant flows, for performing heat exchange between the coolant and the operation fluid that has been evaporated in the evaporation unit, thereby condensing the operation fluid. The evaporation-side communication part connects the evaporation unit and the condensation unit for introducing evaporated operation fluid from the evaporation unit to the condensation unit. The condensation-side communication part connects the condensation unit and the evaporation unit for introducing condensed operation fluid from the condensation unit to the evaporation unit. The condensation-side communication part is thermally in contact with an outer surface of the duct member at least at a part.

Since the condensation-side communication part is thermally in contact with the outer surface of the duct member at least at a part, heat of the duct member can be conducted to the condensation-side communication part. Therefore, when the engine is started in a condition where the operation fluid is frozen in the condensation-side communication part, the condensation-side communication part is heated by the heat of the duct member through which hot exhaust gas flows. As such, the frozen operation fluid in the condensation-side communication part is readily melted. Accordingly, the time required for melting the frozen operation fluid at the starting of the engine is shortened with a simple structure while maintaining heat exchange efficiency.

BRIEF DESCRIPTION OF THE DRAWINGS

Other objects, features and advantages of the present invention will become more apparent from the following detailed description made with reference to the accompanying drawings, in which like parts are designated by like reference numbers and in which:

FIG. 9 is a schematic cross-sectional view of an exhaust heat recovery apparatus according to a sixth embodiment of the present invention;

DETAILED DESCRIPTION OF EXEMPLARY EMBODIMENTS

First Embodiment

A first embodiment of the present invention will now be described with reference to FIGS. 1A to 2. An exhaust heat recovery apparatus of the present embodiment is employed in a vehicle that is driven by an engine (e.g., internal combustion engine), for recovering exhaust heat of an exhaust gas from an exhaust system of the engine and using the heat for facilitating a warming up or the like.

Figure 1A:
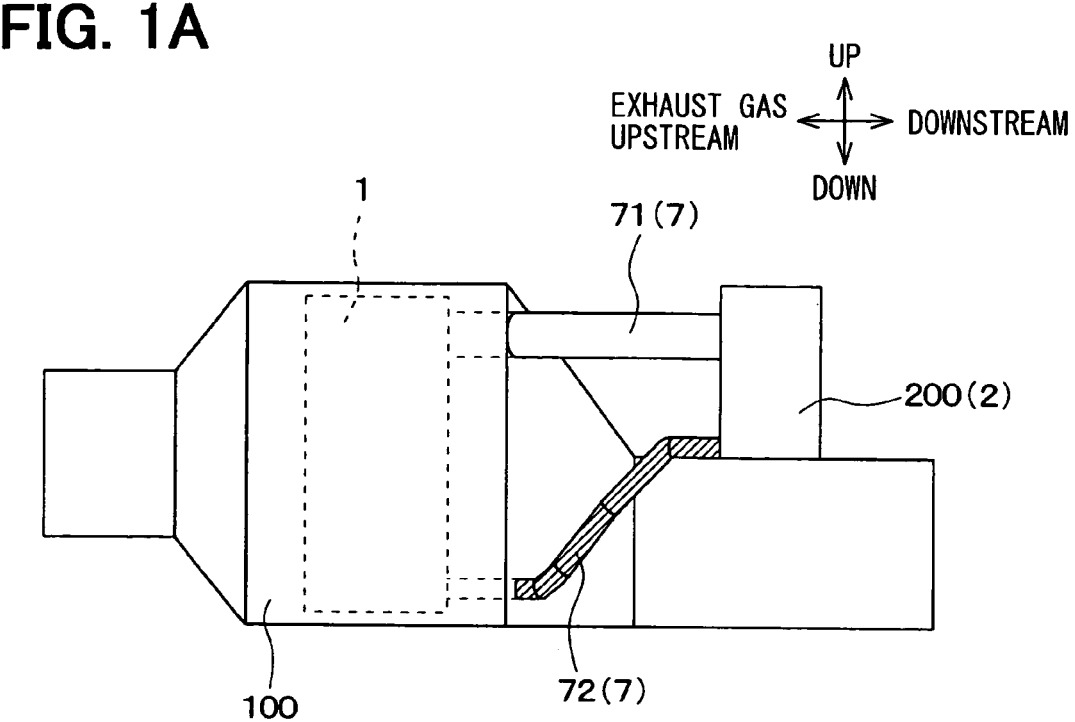
FIG. 1A is a front view of an exhaust heat recovery apparatus according to a first embodiment of the present invention.
Figure 1B:
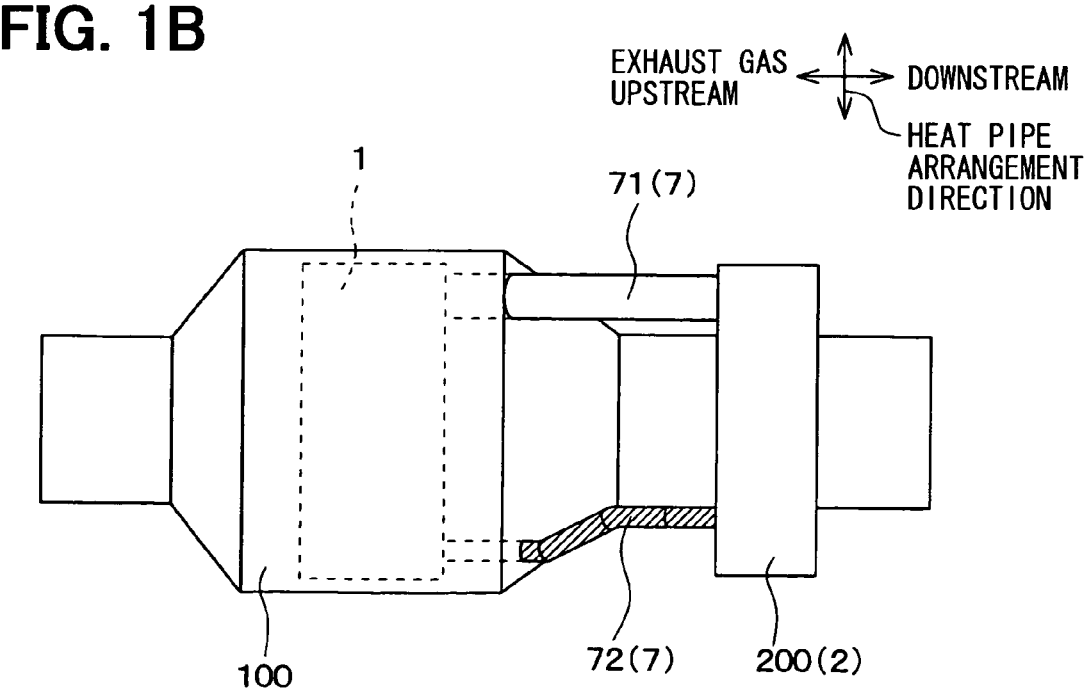
FIG. 1B is a plan view of the exhaust heat recovery apparatus according to the first embodiment.

FIGS. 1A and 1B show the exhaust heat recovery apparatus of the present embodiment. In FIGS. 1A and 1B, a coolant inlet port 201 and a coolant outlet port 202 of the exhaust heat recovery apparatus are omitted. In FIG. 2, an evaporation unit 1 and a condensation unit 2 of the exhaust heat recovery apparatus are shown in parallel with each other for convenience of explanation. However, in an actual heat recovery apparatus, the evaporation unit 1 and the condensation unit 2 are arranged with respect to a vehicle front and rear direction, such as in a flow direction of an exhaust gas.

The exhaust heat recovery apparatus generally includes the evaporation unit 1 and the condensation unit 2. The evaporation unit 1 is disposed in a duct member through which the exhaust gas from the engine flows. In the present embodiment, the evaporation unit 1 is disposed in an exhaust pipe 100 of the engine, through which the exhaust gas generated from the engine flows. The evaporation unit 1 performs heat exchange between the exhaust gas and an operation fluid flowing inside of the evaporation unit 1, thereby to evaporate the operation fluid. In the present embodiment, the exhaust pipe 100 is made of a metal.

The condensation unit 2 is disposed outside of the exhaust pipe 100. The condensation unit 2 is disposed in a housing 200 that is in communication with a coolant passage (not shown) of the engine, through which an engine coolant flows. The condensation unit 2 performs heat exchange between the operation fluid that has been evaporated in the evaporation unit 1 and the engine coolant, thereby to condense the operation fluid. The housing 200 has the coolant inlet port 201 and the coolant outlet port 202. The coolant inlet port 201 is coupled to the coolant passage at a position downstream of the engine for introducing the coolant into the housing 200. The coolant outlet port 202 is coupled to the coolant passage at a position upstream of the engine for introducing the coolant from the housing 200 to the coolant passage.

The evaporation unit 1 and the condensation unit 2 are arranged adjacent to each other with respect to a flow direction of the exhaust gas. In the present embodiment, the evaporation unit 1 is disposed upstream of the condensation unit 2 with respect to the flow direction of the exhaust gas. For example, the exhaust pipe 110 is arranged to extend in the vehicle front and rear direction. In this case, therefore, an arrangement direction of the evaporation unit 1 and the condensation unit 2 corresponds to the vehicle front and rear direction.

Next, a structure of the evaporation unit 1 will be described.

Figure 2:
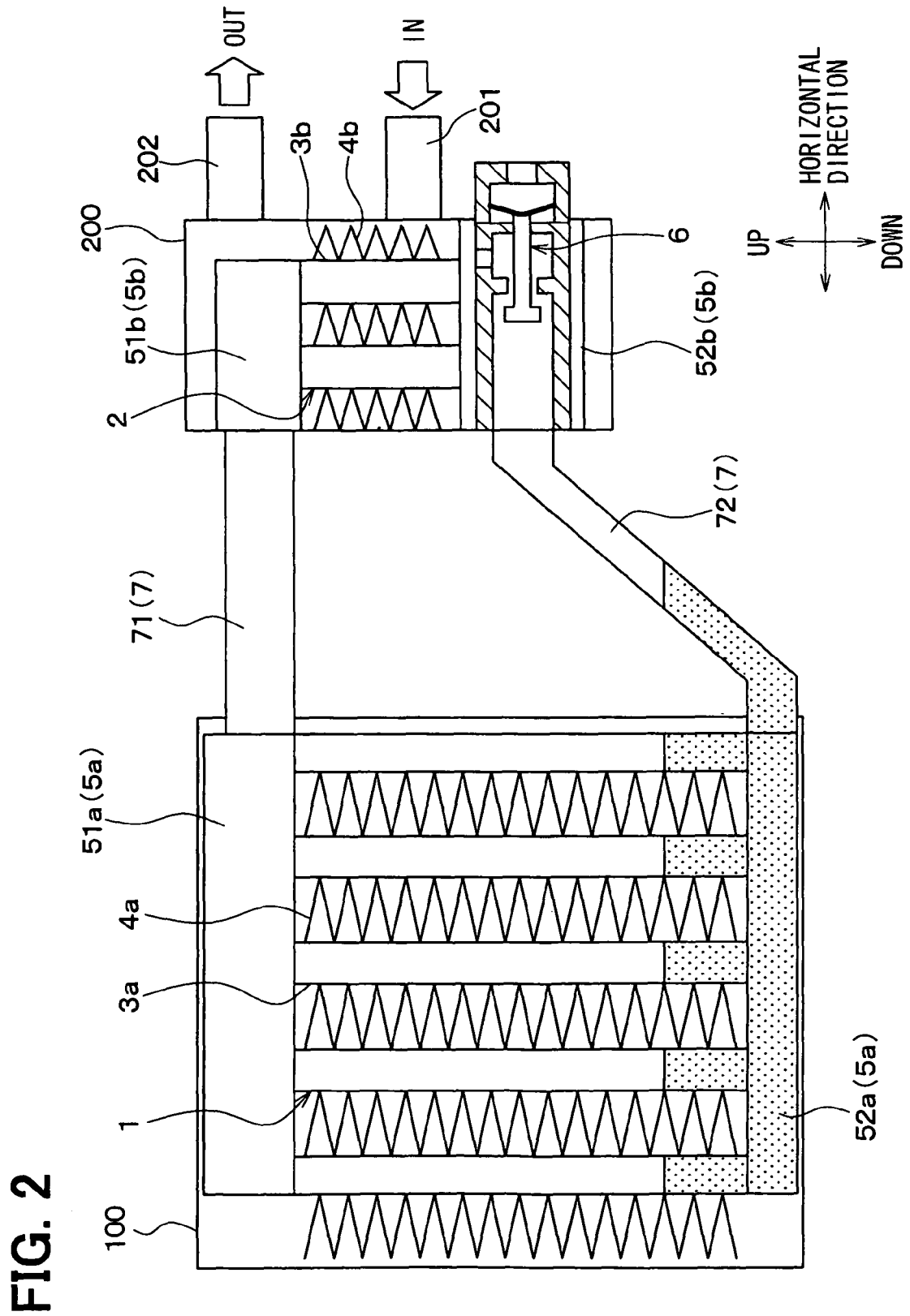
FIG. 2 is a schematic cross-sectional view of the exhaust heat recovery apparatus according to the first embodiment.

As shown in FIG. 2, the evaporation unit 1 has a plurality of evaporation-side heat pipes 3a and evaporation-side fins 4a joined to outer surfaces of the heat pipes 3a. The fins 4a are, for example, corrugate fins. The heat pipes 3a are arranged parallel to each other. Each of the heat pipes 3a has a generally flat tubular shape. The heat pipe 3a is orientated such that its longitudinal axis extends in a vertical direction. Also, the heat pipe 3a is orientated such that a major axis of a cross-section defined in a direction perpendicular to the longitudinal axis of the pipe 3a is substantially parallel to the flow direction of the exhaust gas, such as in a direction perpendicular to a paper surface of FIG. 2.

The evaporation unit 1 has evaporation-side headers 5a at opposite ends of the heat pipes 3a. The headers 5a extend in a pipe arrangement direction in which the heat pipes 3a are arranged, and are communicated with all the heat pipes 3a. One of the headers 5a, which is in communication with upper ends of the heat pipes 3a, is referred to as a first evaporation-side header 51a, and the other header 5a, which is in communication with lower ends of the heat pipes 3a, is referred to as a second evaporation-side header 52a.

Next, a structure of the condensation unit 2 will be described.

The condensation unit 2 includes condensations-side heat pipes 3b and condensation-side fins 4b joined to outer surfaces of the heat pipes 3b. The fins 4b are, for example, corrugate fins. The heat pipes 3b are generally flat tubes. The heat pipes 3b are arranged parallel to each other. Each of the heat pipes 3b is orientated such that its longitudinal axis extends in the vertical direction. Also, the heat pipe 3b is orientated such that a major axis of a cross-section defined in a direction perpendicular to the longitudinal axis of the pipe 3b is substantially parallel to the flow direction of the exhaust gas passing through the evaporation unit 1, such as in the direction perpendicular to the paper surface of FIG. 2.

The condensation unit 2 includes condensation-side headers 5b at both ends of the heat pipes 3b. The headers 5b extend in a pipe arrangement direction in which the heat pipes 3b are arranged, and are communicated with all the heat pipes 3b. One of the headers 5b, which is in communication with upper ends of the heat pipes 3b, is referred to as a first condensation-side header 51b, and the other header 5b, which is in communication with lower ends of the heat pipes 3b, is referred to as a second condensation-side header 52b.

The second condensation-side header 52b is provided with a valve mechanism 6. The valve mechanism 6 is, for example, a diaphragm valve. The valve mechanism 6 forms a passage that allows communication between the condensation-side heat pipes 3b and the second evaporation-side header 52a. The valve mechanism 6 is capable of opening and closing the passage in accordance with an internal pressure of the evaporation-side heat pipe 3a, that is, pressure of the operation fluid. Specifically, the valve mechanism normally opens the passage. The valve mechanism 6 closes the passage when the internal pressure exceeds a first predetermined pressure under a predetermined temperature of the coolant. The valve mechanism 6 reopens the passage when the internal pressure becomes lower than a second predetermined pressure that is lower than the first predetermined pressure.

The evaporation-side headers 5a are in communication with the condensation-side headers 5b through communication parts 7, which have substantially tubular shapes. Thus, a closed, looped path is formed by the heat pipes 3a, 3b, the headers 5a, 5b and the communication parts 7. The path is filled with the operation fluid that is capable of being evaporated and condensed, such as water, alcohol or the like. Accordingly, the operation fluid circulates through the evaporation unit 1 and the condensation unit 2.

One of the communication parts 7, which is located on an upper side and connects the first evaporation-side header 51a and the first condensation-side header 51b, is referred to as a evaporation-side communication part 71. The operation fluid that has been evaporated in the evaporation unit 1 is introduced to the condensation unit 2 through the evaporation-side communication part 71.

The other communication part 7, which is located on a lower side and connects the second evaporation-side header 52a and the second condensation-side header 52b, is referred to as a condensation-side communication part 72. The operation fluid that has been condensed in the condensation unit 2 is introduced to the evaporation unit 1 through the condensation-side communication part 72.

The second condensation-side header 52b is located higher than the second evaporation-side header 52a, in a condition that the exhaust heat recovery apparatus is mounted in a vehicle that is on a horizontal plane. That is, the second condensation-side header 52b is located higher than the second evaporation-side header 52a with respect to a vertical direction that is perpendicular to a horizontal plane of the vehicle. A portion of the condensation-side communication part 72 is inclined such that a first end (i.e., condensation-side end, upstream end with respect to the flow of the operation fluid) is higher than a second end (i.e., evaporation-side end, downstream end with respect to the flow of the operation fluid) in the condition mounted on the vehicle that is on the horizontal plane.

As shown in FIGS. 1A and 1B, an external portion of the condensation-side communication part 72, which is located outside of the exhaust pipe 100 and the housing 200, is in contact with an outer surface of the exhaust pipe 100. That is, the external portion of the condensation-side communication part 72 is thermally in contact with the outer surface of the exhaust pipe 100.

In the present embodiment, the external portion is in contact with the outer surface of the exhaust pipe 100 over its length with respect to the flow direction of the operation fluid in the condensation-side communication part 72. In FIGS. 1A and 1B, the external portion is shaded for convenience of explanation.

The condensation-side communication part 72 is preferably made of a material having high heat conductivity. In the present embodiment, parts constructing the evaporation unit 1, the condensation unit 2 and the evaporation-side communication part 71, such as the heat pipes 3a, 3b, the fins 4a, 4b, the headers 5a, 5b, are made of stainless steel. The condensation-side communication part 72 is made of copper or aluminum, which has heat conductivity higher than the stainless steel.

Since the condensation-side communication part 72 is thermally in contact with the outer surface of the exhaust pipe 100 at least at a part, heat of the exhaust pipe 100 can be conducted to the condensation-side communication part 72. When the operation of the engine is started in a condition where the operation fluid is frozen in the condensation-side communication part 72, the condensation-side communication part 72 is heated by the heat of the exhaust pipe 100 through which the exhaust gas having high temperature passes. Therefore, the frozen operation fluid in the condensation-side communication part 72 is melted. In this case, an additional member such as a heater is not required to melt the frozen operation fluid. Also, it is not necessary to reduce the amount of the operation fluid, as a conventional apparatus. Accordingly, in the present embodiment, the frozen operation fluid is melted with a simple structure and in a short time at the starting of the engine while maintaining heat exchange efficiency.

Since the condensation-side communication part 72 is made of the material having the heat conductivity higher than that of the material of the other parts, heat is easily conducted to the condensation-side communication part 72 from the evaporation unit 1, which is heated by the heat of the exhaust gas. That is, the amount of heat conducted from the evaporation unit 1 to the condensation-side communication part 72 is increased. Therefore, the time required for melting the frozen operation fluid at the starting of the engine is further shortened.

Second Embodiment

Figure 3A:
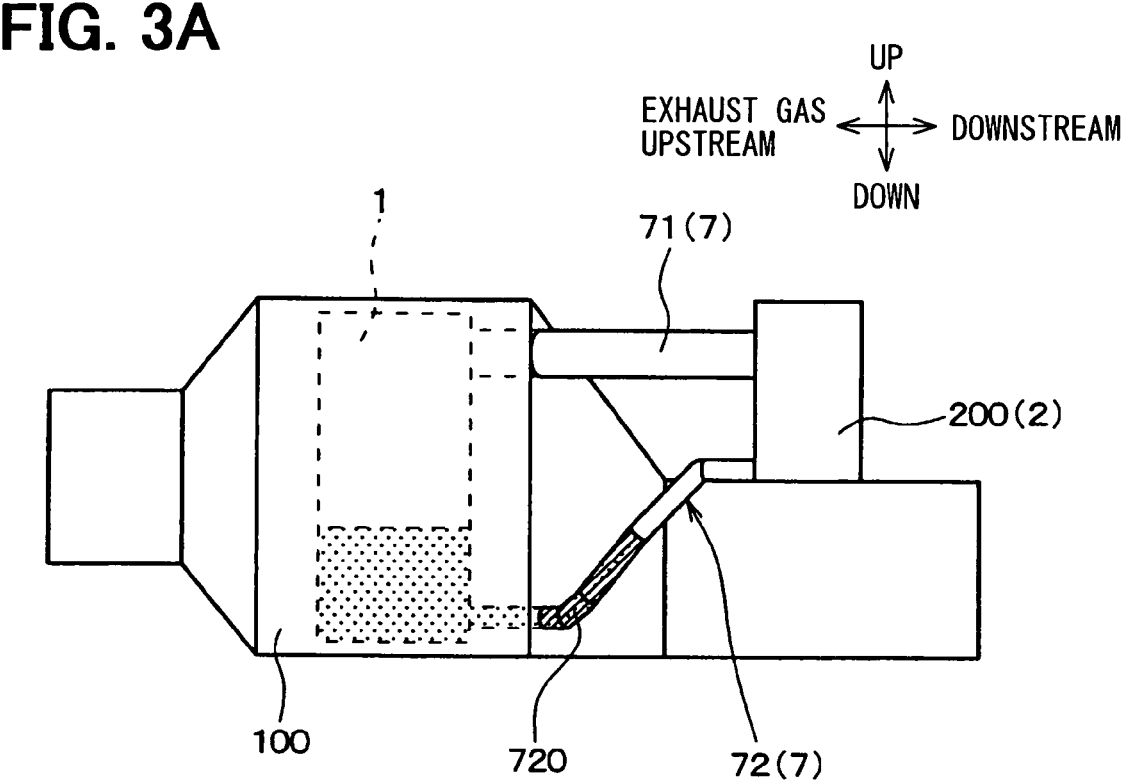
FIG. 3A is a front view of an exhaust heat recovery apparatus according to a second embodiment of the present invention.
Figure 3B:
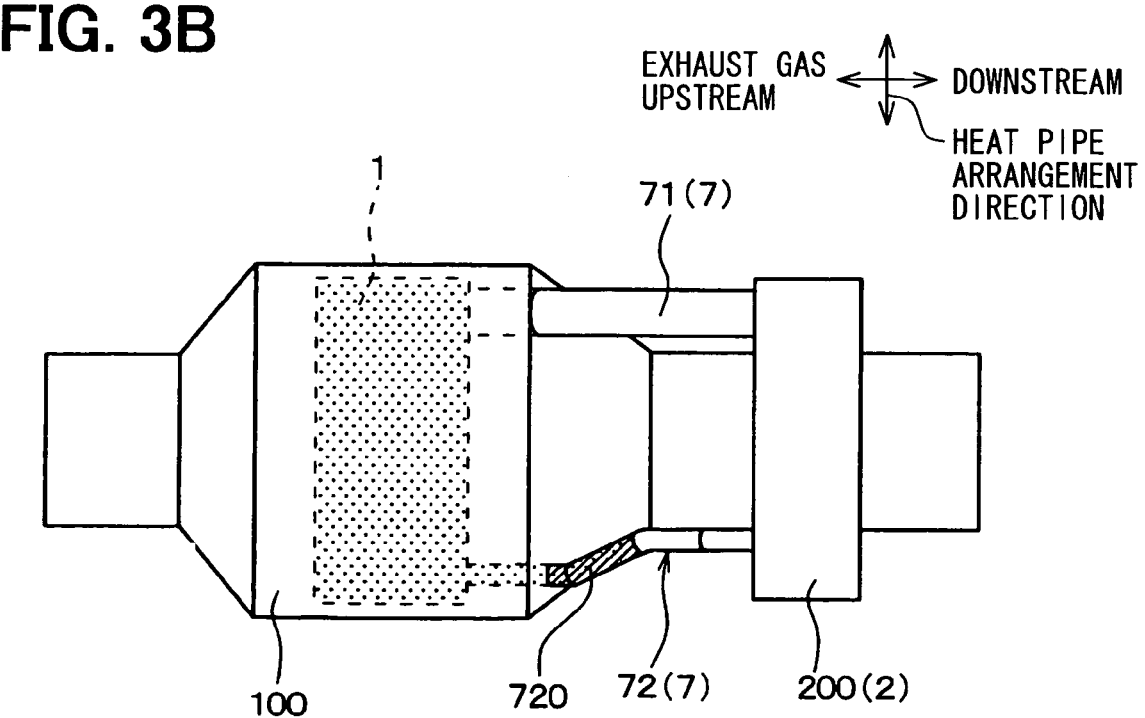
FIG. 3B is a plan view of the exhaust heat recovery apparatus according to the second embodiment.

A second embodiment of the present invention will be described with reference to FIGS. 3A and 3B. Component parts, similar to those of the first embodiment, are denoted by like reference numerals, and a description thereof will not be repeated.

In the present embodiment, only a portion of the condensation-side communication part 72 is in contact with the outer surface of the exhaust pipe 100. Specifically, only the portion in which the frozen operation fluid is assumed to exist in the condensation-side communication part 72 when the operation fluid is frozen is in contact with the outer surface of the exhaust pipe 100. Hereinafter, the portion in which the frozen operation fluid is assumed to exist is referred to as a freezing portion 720. In FIGS. 3A and 3B, the freezing portion 720 is shaded for convenience of explanation.

In the present embodiment, the portion of the condensation-side communication part 72 where the frozen operation fluid possibly exists in a condition where the exhaust heat recovery apparatus is mounted in the vehicle that is on a horizontal plane or that is inclined in a range between 0 degrees and 6 degrees relative to the horizontal plane with respect to the vehicle front and rear direction and/or a vehicle right and left direction is defined as the freezing portion 720. Further, the freezing portion 720 is decided in accordance with the amount of operation fluid introduced in the exhaust heat recovery apparatus during manufacturing.

In the present embodiment, only the freezing portion 720 is thermally in contact with the exhaust pipe 100 and a remaining portion of the condensation-side communication part 72 other than the freezing portion 720 is not thermally in contact with the outer surface of the exhaust pipe 100. Therefore, it is less likely that the operation fluid will be boiled in the condensation-side communication part 72 after being melted, due to continuous heat reception through the exhaust pipe 100. Accordingly, heat exchange efficiency improves.

Third Embodiment

Figure 4A:
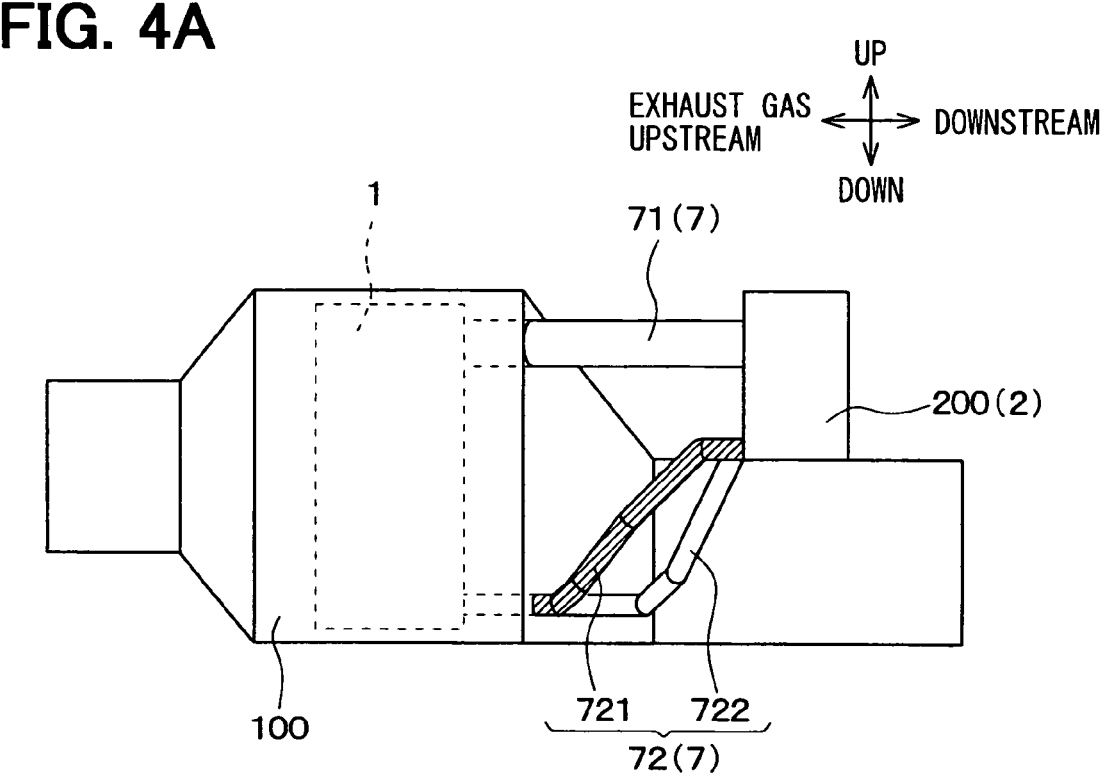
FIG. 4A is a front view of an exhaust heat recovery apparatus according to a third embodiment of the present invention.

A third embodiment of the present invention will be described with reference to FIGS. 4A to 5. Component parts, similar to those of the first embodiment, are denoted by like reference numerals, and a description thereof will not be repeated.

Figure 5:
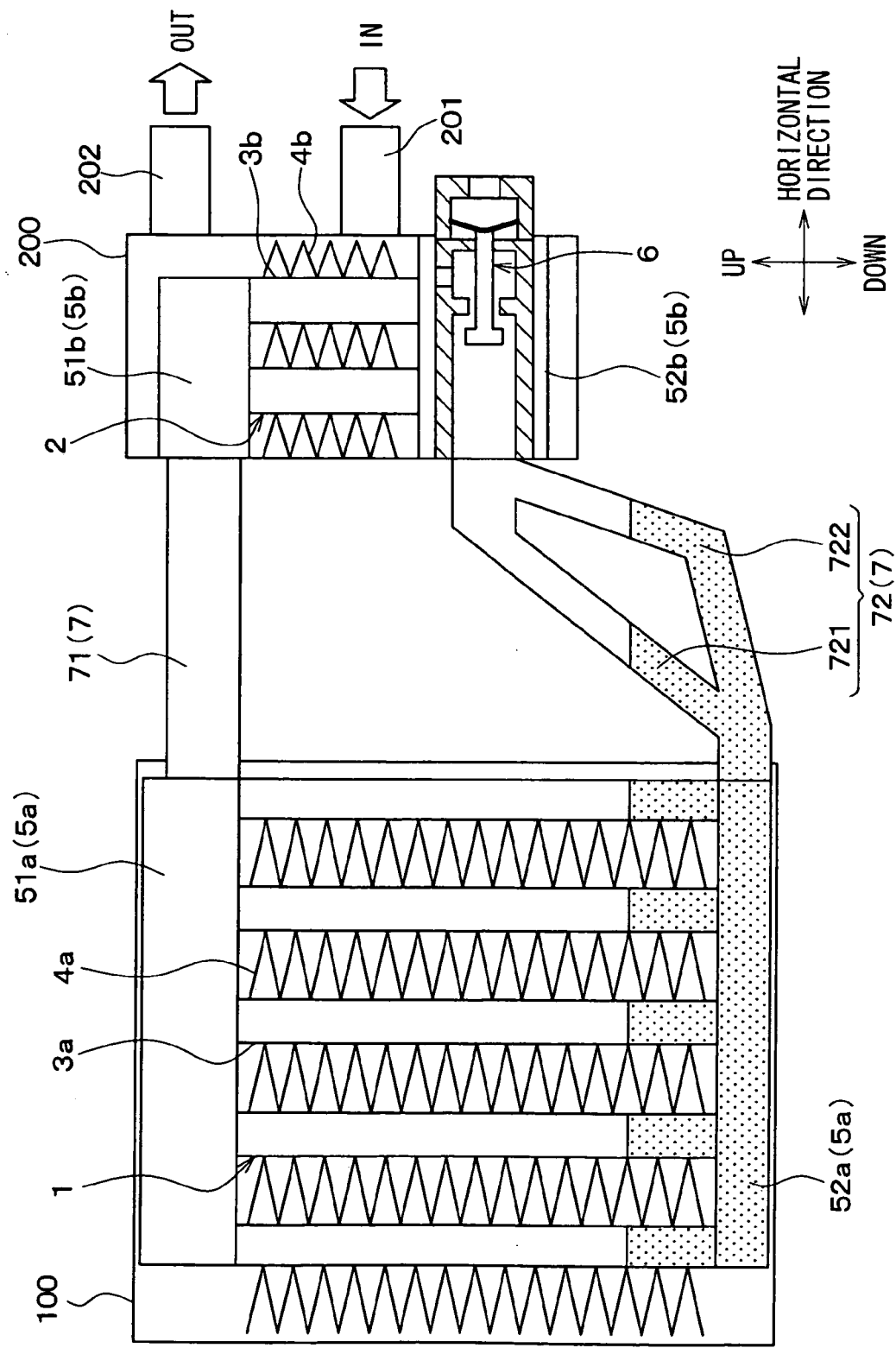
FIG. 5 is a schematic cross-sectional view of the exhaust heat recovery apparatus according to the third embodiment.

In FIG. 5, the evaporation unit 1 and the condensation unit 2 are arranged in parallel for convenience of explanation. However, in the actual exhaust heat recovery apparatus, the evaporation unit 1 and the condensation unit 2 are arranged in the vehicle front and rear direction, such as in the flow direction of the exhaust gas.

Figure 4B:
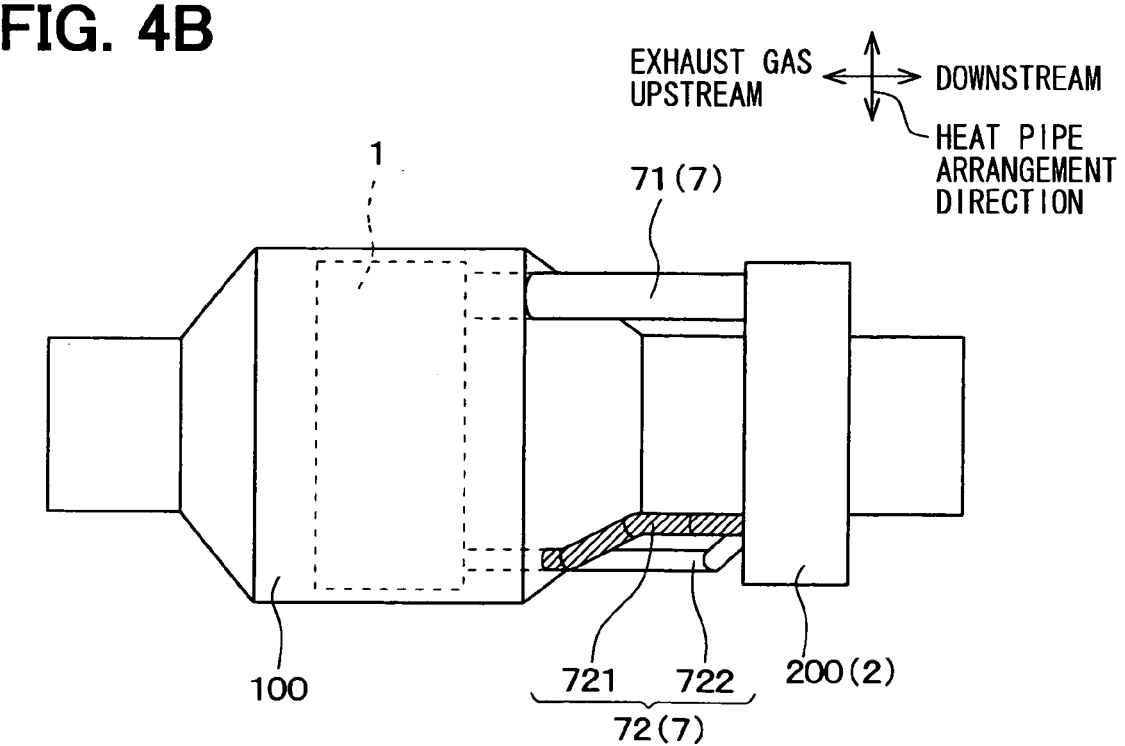
FIG. 4B is a plan view of the exhaust heat recovery apparatus according to the third embodiment.

In the present embodiment, the condensation-side communication part 72 is constructed of a first pipe 721 and a second pipe 722. The first pipe 721 is in contact with the outer surface of the exhaust pipe 100. Specifically, a portion of the first pip 721, which is located outside of the exhaust pipe 100 and the housing 200, is in contact with the outer surface of the exhaust pipe 100. The second pipe 722 is not in contact with the outer surface of the exhaust pipe 100. That is, the second pipe 722 does not thermally contact the exhaust pipe 100. The first pipe 721 is located higher the second pipe 722. In FIGS. 4A and 4B, the portion of the first pipe 721, which is in contact with the outer surface of the exhaust pipe 100, is shaded for convenience of explanation.

In the above structure, when the engine is started in a condition where the operation fluid is frozen in the first pipe 721 and the second pipe 722, the first pipe 721 is heated by the exhaust pipe 100 through which the high temperature exhaust gas flows. Therefore, the frozen operation fluid in the first pipe 721 is melted. Accordingly, the time required for melting the operation fluid at the starting of the engine is shortened.

Even after the operation fluid in the first pipe 721 is melted, the first pipe 721 is heated by the exhaust gas through the exhaust pipe 100. In this case, the operation fluid in the first pipe 721 is likely to be boiled. In the present embodiment, since the second pipe 722 is not thermally in contact with the exhaust pipe 100, the operation fluid can circulate through the second pipe 722 even if the operation fluid is boiled in the first pipe 721. Therefore, the heat exchange efficiency is properly maintained.

Fourth Embodiment

Figure 6:
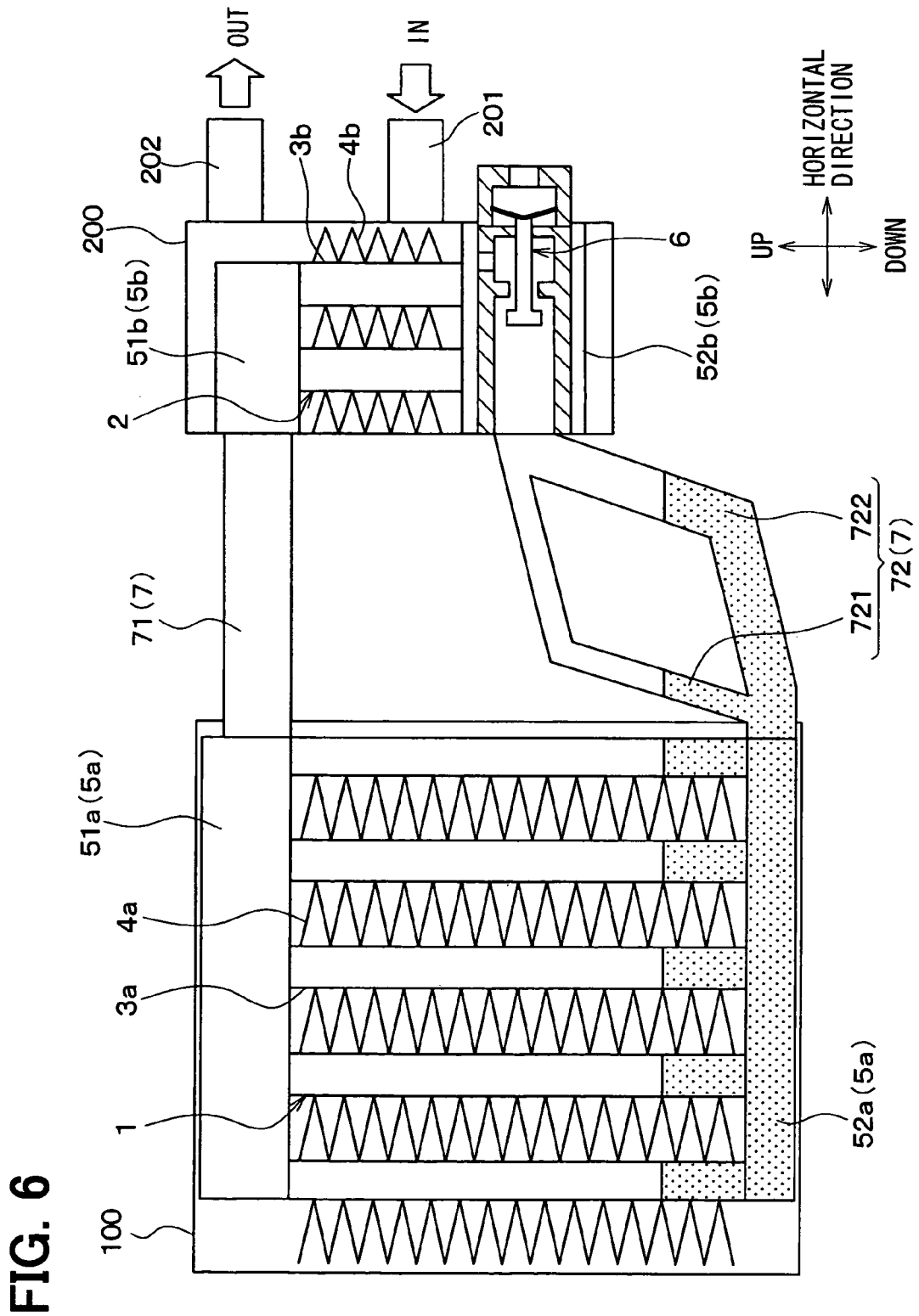
FIG. 6 is a schematic cross-sectional view of an exhaust heat recovery apparatus according to a fourth embodiment of the present invention.

A fourth embodiment of the present invention will be described with reference to FIG. 6. Component parts, similar to those of the third embodiment, are denoted by like reference numerals, and a description thereof will not be repeated.

In the present embodiment, a passage area (e.g., cross-sectional area) of the first pipe 721 is smaller than that of the second pipe 722. In this structure, the volume of the operation fluid frozen in the first pipe 721 is reduced. Therefore, the time required for melting the operation fluid at the starting of the engine is further shortened.

Fifth Embodiment

A fifth embodiment of the present invention will be described with reference to FIGS. 7 and 8. Component parts, similar to those of the first embodiment, are denoted by like reference numerals, and a description thereof will not be repeated.

Figure 7:
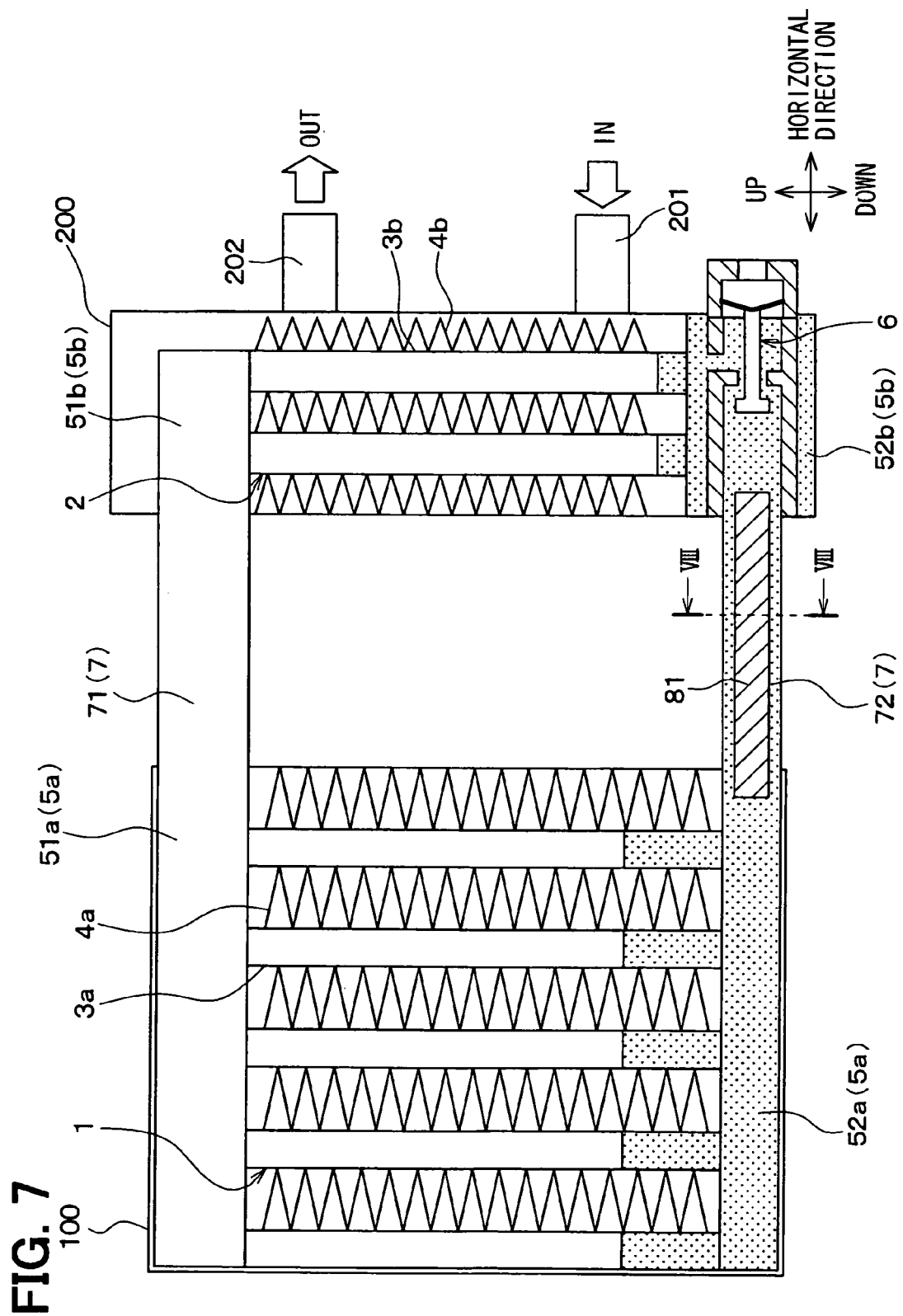
FIG. 7 is a schematic cross-sectional view of an exhaust heat recovery apparatus according to a fifth embodiment of the present invention.

As shown in FIG. 7, a rod 81 as a heat conductive member is disposed in the condensation-side communication part 72. The rod 81 is made of a material having high heat conductivity, such as copper or aluminum. A first end of the rod 81 is located in the second evaporation-side header 52a, and a second end of the rod 81 is located in the second condensation-side header 52b.

Figure 8:
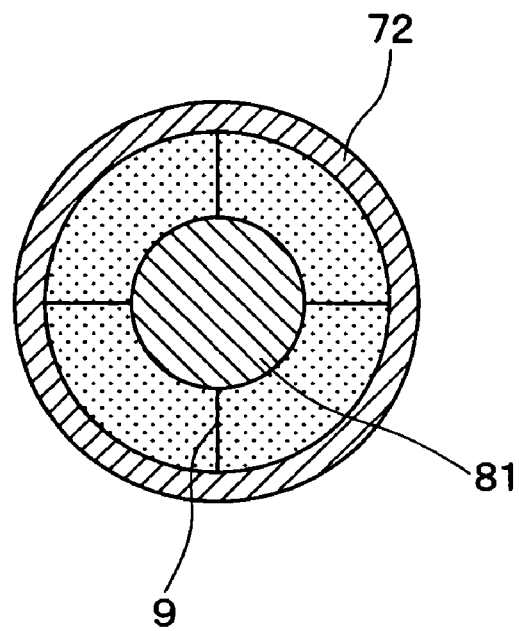
FIG. 8 is a cross-sectional view taken along a line VIII-VIII in FIG. 7.

As shown in FIG. 8, the condensation-side communication part 72 is provided with a support member 9 for supporting the rod 81. The support member 9 supports the rod 81 such that the rod 81 does not directly contact an inner surface of the condensation-side communication part 72, inside of the condensation-side communication part 72. The support member 9 is made of a material having high heat conductivity, such as copper or aluminum.

When the engine is started in a condition that the operation fluid is frozen, the evaporation unit 1 is heated by the heat of the exhaust gas. Therefore, the operation fluid inside of the evaporation unit 1 melts prior to the operation fluid inside of the condensation-side communication part 72. Because the evaporation unit 1 receives the heat of the exhaust gas even after the operation fluid in the evaporation unit 1 is melted, the temperature of the operation fluid inside of the evaporation unit 1 increases.

In the present embodiment, the rod 81 having high heat conductivity is disposed in the condensation-side communication part 72 and the first end of the rod 81 is disposed inside of the evaporation unit 1, that is, inside of the second evaporation-side header 52a. Therefore, the heat of the operation fluid inside of the evaporation unit 1 can be conducted to the frozen operation fluid in the condensation-side communication part 72 through the rod 81. Accordingly, the time required for melting the operation fluid is further shortened.

Sixth Embodiment

A sixth embodiment of the present invention will be described with reference to FIGS. 9 and 10. Component parts, similar to those of the first embodiment, are denoted by like reference numerals, and a description thereof will not be repeated.

As shown in FIG. 9, a pipe member 82 as the heat conductive member is disposed in the condensation-side communication part 72. The pipe member 82 is made of a material having high heat conductivity, such as copper or aluminum. A first end of the pipe member 82 is located in the second evaporation-side header 52a and a second end of the pipe member 82 is located in the second condensation-side header 52b. Further, the pipe member 82 defines a passage space therein to allow the operation fluid to pass through.

Figure 10:
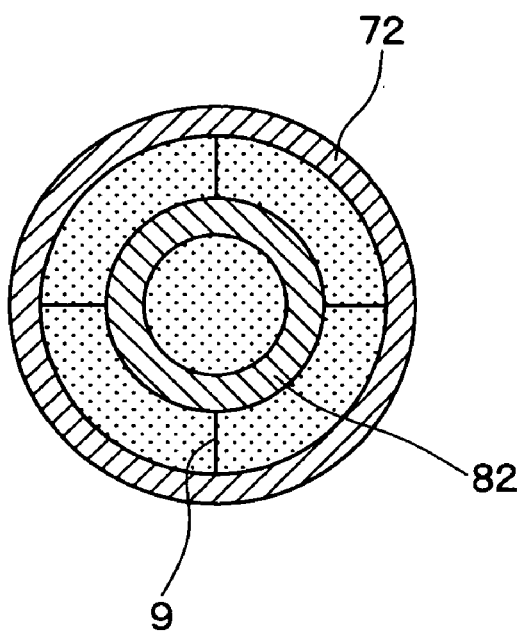
FIG. 10 is a cross-sectional view taken along a line X-X in FIG. 9.

As shown in FIG. 10, the condensation-side communication part 72 is provided with the support member 9 for supporting the pipe member 82. The support member 9 supports the pipe member 82 such that the pipe member 82 does not directly contact the inner surface of the condensation-side communication part 72, inside of the condensation-side communication part 72. The support member 9 is made of a material having high heat conductivity, such as copper or aluminum.

Next, an operation of the exhaust heat recovery apparatus of the present embodiment will be described.

When the engine is started in a condition where the operation fluid is frozen, the evaporation unit 1 is heated by the heat of the exhaust gas. Therefore, the operation fluid inside of the evaporation unit 1 melts prior to the operation fluid inside of the condensation-side communication part 72. Because the evaporation unit 1 receives the heat of the exhaust gas even after the operation fluid inside of the evaporation unit 1 is melted, the temperature of the operation fluid inside of the evaporation unit 1 increases.

The heat of the operation fluid inside of the evaporation unit 1 is conducted to the frozen operation fluid inside of the pipe member 82 through the pipe member 82. Therefore, the frozen operation fluid inside of the pipe member 82 is melted, and hence a circulation of the operation fluid is started. Because the operation fluid circulates through the inside of the pipe member 82, the temperature of an outer surface of the pipe member 82 increases. As such, the frozen operation fluid outside of the pipe member 82 is melted.

As discussed above, in the present embodiment, the pipe member 82 is disposed in the condensation-side communication part 72, and the first end of the pipe member 82 is located inside of the evaporation unit 1, that is, inside of the second evaporation-side header 52a. Therefore, the heat of the operation fluid inside of the evaporation unit 1 can be conducted to the frozen operation fluid inside of the condensation-side communication part 72. Accordingly, the time required for melting the frozen operation fluid a the starting of the engine is further shortened.

Seventh Embodiment

A seventh embodiment of the present invention will be described with reference to FIG. 11. Component parts, similar to those of the first embodiment, are denoted by like reference numerals, and a description thereof will not be repeated.

Figure 11:
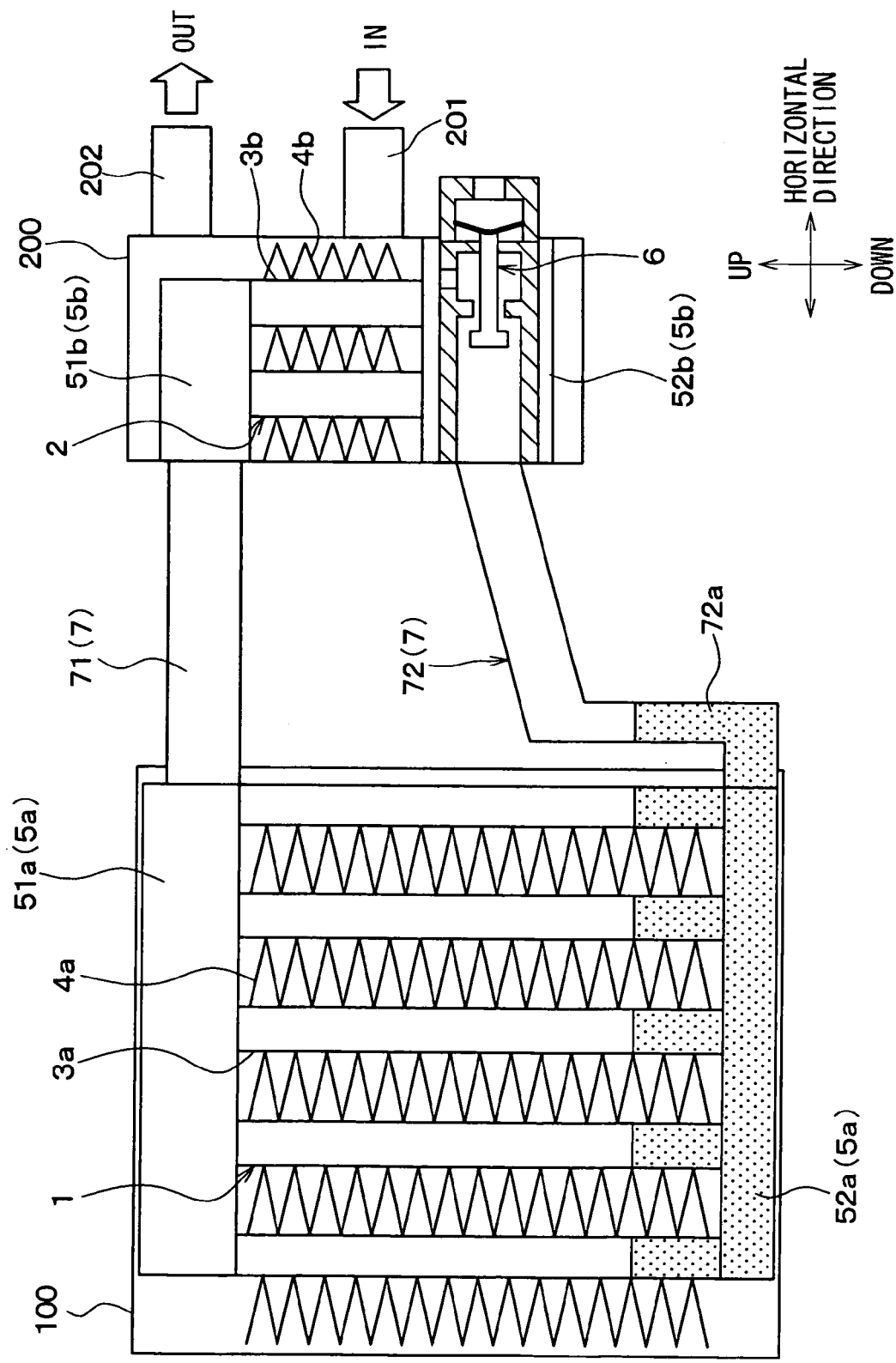
FIG. 11 is a schematic cross-sectional view of an exhaust heat recovery apparatus according to a seventh embodiment of the present invention.

As shown in FIG. 11, an external portion of the condensation-side communication part 72, which is located outside of the exhaust pipe 100, includes a rising portion 72a at an end adjacent to the evaporation unit 1. The rising portion 72a extends in a vertical direction when the exhaust heat recovery apparatus is mounted in the vehicle, which is on the horizontal plane. That is, the rising portion 72a extends perpendicular to a horizontal direction of the vehicle. Specifically, the rising portion 72a is configured such that its upstream end with respect to the flow of the operation fluid is higher than is downstream end. Further, the rising portion 72a is in contact with the outer surface of the exhaust pipe 100.

In the above construction, the volume of the frozen operation fluid inside of the condensation-side communication part 72 is reduced. Therefore, the time required for melting the frozen operation fluid at the starting of the engine is further reduced.

Other Embodiments

Figure 12:
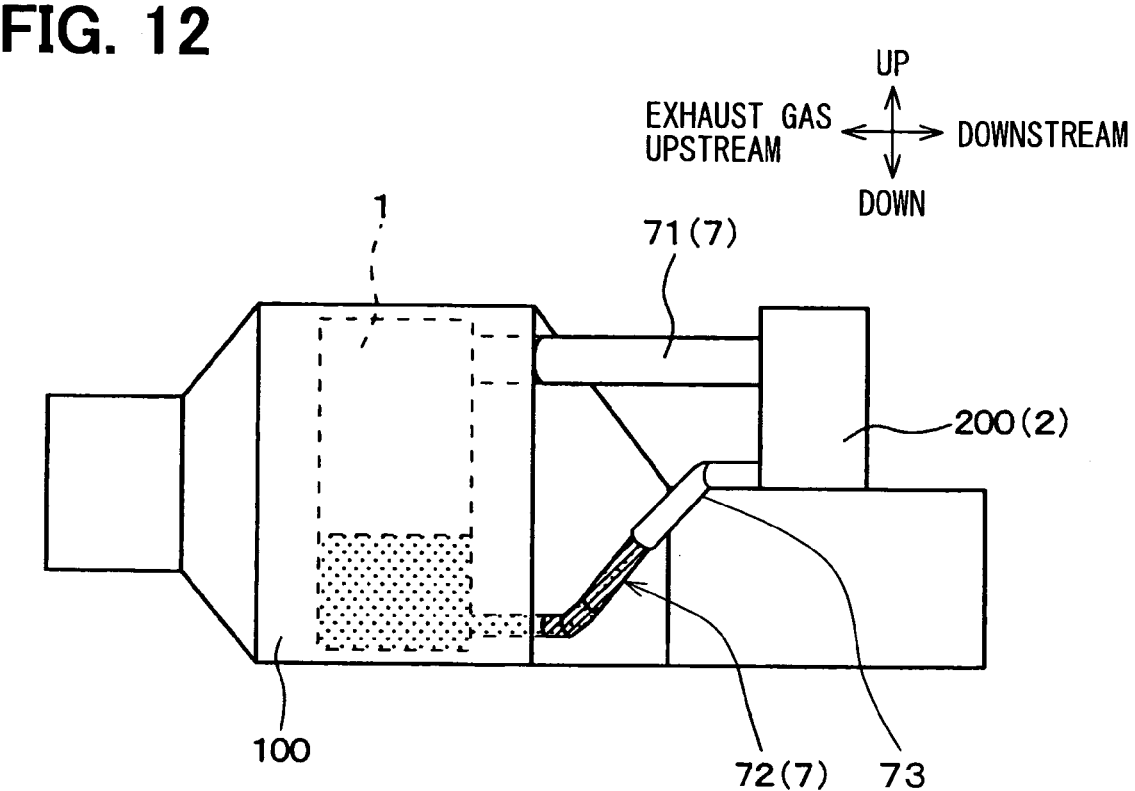
FIG. 12 is a schematic front view of an exhaust heat recovery apparatus according to further another embodiment of the present invention.
Figure 13:
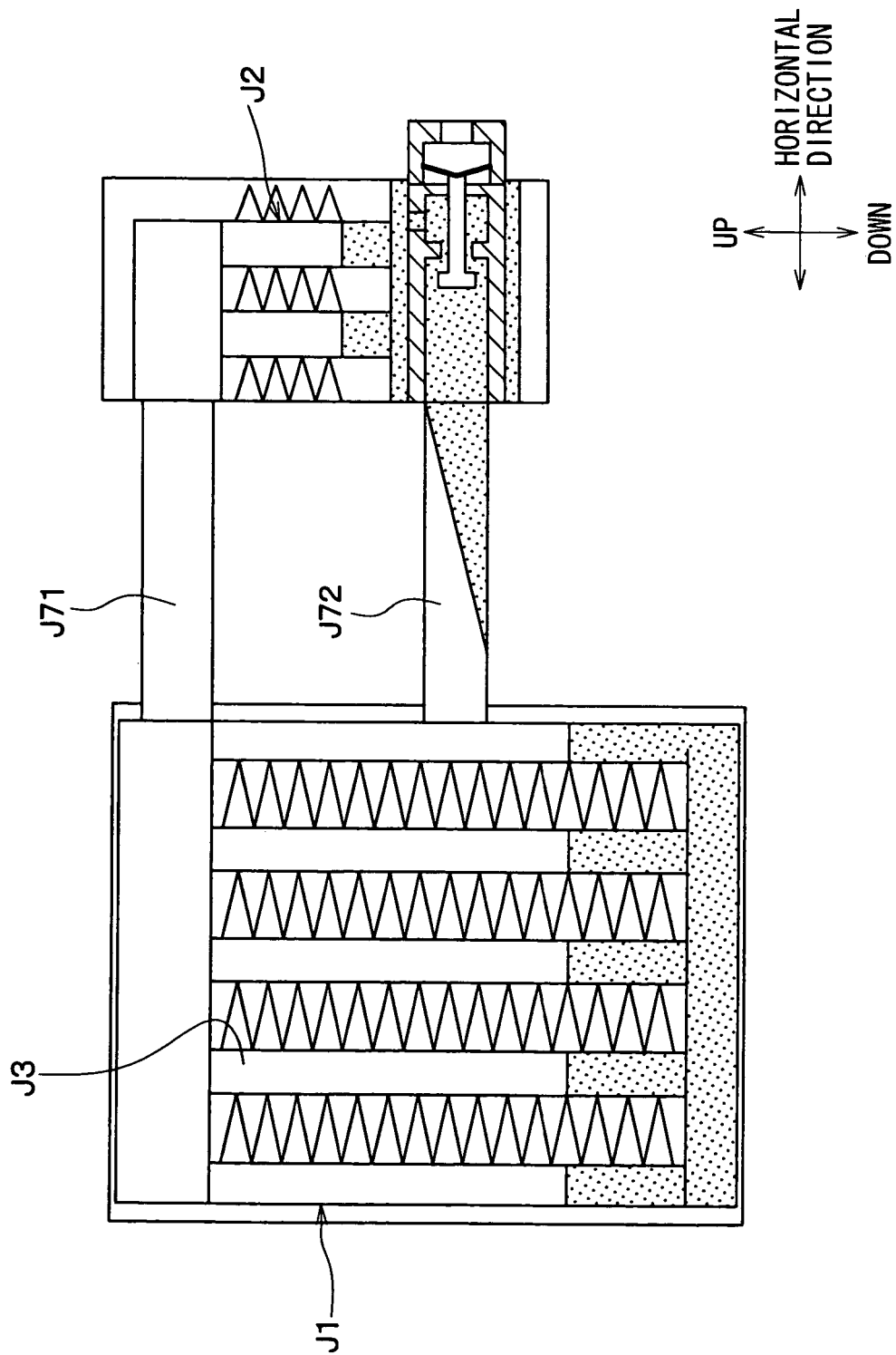
FIG. 13 is a schematic cross-sectional view of an exhaust heat recovery apparatus of a related art.

In the fifth and sixth embodiments, a portion of the condensation-side communication part, which is not in contact with the outer surface of the exhaust pipe 100, may be covered with a thermal insulating member 73 for restricting heat transfer between the inside and the outside of the condensation-side communication part 72, as shown in FIG. 12. In this case, heat radiation through the condensation-side communication part 72 is reduced. Therefore, the heat of the operation fluid inside of the evaporation unit 1 is efficiently conducted to the frozen operation fluid inside of the condensation-side communication part 72. Accordingly, the time required for melting the frozen operation fluid at the starting of the engine is further shortened.

In the third and fourth embodiments, the first pipe 721, which is in contact with the outer surface of the exhaust pipe 100, is located higher than the second pipe 722, which is not in contact with the outer surface of the exhaust pipe 100. However, the arrangement of the first pipe 721 and the second pipe 722 can be modified. For example, the first pipe 721 may be located lower than the second pipe 722.

In the third and fourth embodiments, the condensation-side communication part 72 includes the single first pipe 721 and the single second pipe 722. However, the number of the first pipe 721 and the second pipe 722 can be modified. For example, the condensation-side communication part 72 may have two or more than two first pipes 721 and/or two or more than two second pipes 722.

In the above embodiments, the condensation unit 2 have the heat pipes 3b, and the heat pipes 3b are oriented in the up and down direction and arranged parallel to each other. However, the structure of the condensation unit 2 is not limited to the above discussed structure. The condensation unit 2 may have any other structures.

Further, the present invention can be implemented by combining the above embodiments in various ways.

Additional advantages and modifications will readily occur to those skilled in the art. The invention in its broader term is therefore not limited to the specific details, representative apparatus, and illustrative examples shown and described.

What is claimed is:
1. An exhaust heat recovery apparatus, comprising:
an evaporation unit that is disposed in an exhaust gas passage through which an exhaust gas generated from an internal combustion engine flows, and performs heat exchange between the exhaust gas and an evaporable and condensable operation fluid enclosed in the evaporation unit, thereby to evaporate the operation fluid;
a condensation unit that is disposed in a coolant passage through which a coolant of the internal combustion engine flows, and performs heat exchange between the coolant and the operation fluid evaporated in the evaporation unit, thereby to condense the operation fluid, wherein the condensation unit and the evaporation unit are disposed in a closed loop passage through which the operation fluid circulates;

an evaporation-side communication part that conducts the operation fluid evaporated in the evaporation unit to the condensation unit; and a condensation-side communication part that conducts the operation fluid condensed in the condensation unit to the evaporation unit, wherein the condensation-side communication part, which is located lower than an outlet of the condensation unit, includes a freezing portion, the freezing portion being defined by the portion of the condensation-side communication part in which a frozen operation fluid is located when the operation fluid is frozen, the size of said freezing portion being based on an enclosed amount of the operation fluid, only the freezing portion of the condensation-side communication part is thermally in contact with the outer surface of the exhaust passage, and an upper end of the freezing portion is located higher than the frozen operation fluid in a condition of being mounted in a vehicle that is on a horizontal plane, and a lower end of the freezing portion is connected to the evaporation unit.

2. The exhaust heat recovery apparatus according to claim 1, wherein the condensation-side communication part is a first condensation-side communication part that is thermally in contact with the outer surface of the exhaust gas passage, the exhaust heat recovery apparatus further comprising a second condensation-side communication part that is disposed without thermally contacting the outer surface of the exhaust gas passage.

3. The exhaust heat recovery apparatus according to claim 2, wherein the first condensation-side communication part has a passage area smaller than a passage area of the second condensation-side communication part.

4. The exhaust heat recovery apparatus according to claim 1, wherein the condensation-side communication part is made of a material having heat conductivity higher than that of a material forming the evaporation unit.

5. The exhaust heat recovery apparatus according to claim 1, further comprising a high heat conductive member that has heat conductivity higher than that of a material forming the evaporation unit, wherein the high heat conductive member is disposed inside of the condensation-side communication part, and an end of the high heat conductive member is located inside of the evaporation unit.

6. The exhaust heat recovery apparatus according to claim 5, wherein the high heat conductive member has a rod shape.

7. The exhaust heat recovery apparatus according to claim 5, wherein the high heat conductive member has a pipe shape.

8. The exhaust heat recovery apparatus according to claim 5, wherein the condensation-side communication part includes a support member on an inner wall thereof, and the high heat conductive member is supported inside of the condensation-side communication part by the support member.

9. The exhaust heat recovery apparatus according to claim 1, wherein a portion of the condensation-side communication part that is located outside of the exhaust gas passage includes a rising portion at an end adjacent to the evaporation unit, the rising portion extending in a vertically upward direction in a condition of being mounted in the vehicle that is on the horizontal plane, and the rising portion is disposed such that an upstream end thereof is located higher than a lower end thereof with respect to a flow of the operation fluid in the rising portion.

10. The exhaust heat recovery apparatus according to claim 1, wherein the condensation-side communication part includes a thermal insulation member on a portion of the condensation-side communication part to restrict heat transfer between an inside and an outside of the condensation-side communication part, the portion being disposed without thermally contacting the outer surface of the exhaust gas passage.

\* \* \* \* \*